(12) United States Patent
Devagnanam

(10) Patent No.: US 6,440,884 B1
(45) Date of Patent: Aug. 27, 2002

(54) COMPOSITION AND PROCESS FOR MAKING BUILDING BRICKS AND TILES

(76) Inventor: Theophilis A. Devagnanam, Needle Industries (India) Limited, P.O. Box 643 243, Ketti, Tamil Nadu (IN)

( * ) Notice: Subject to any disclaimer, the term of this patent is extended or adjusted under 35 U.S.C. 154(b) by 0 days.

(21) Appl. No.: 09/809,174

(22) Filed: Mar. 16, 2001

(30) Foreign Application Priority Data

Mar. 23, 2000 (IN) .................................. 232/MAS/2000

(51) Int. Cl.⁷ ........................ C04B 33/00; C04B 33/04
(52) U.S. Cl. ...................... 501/141; 501/155; 264/679; 264/680; 588/9; 588/10; 588/901; 588/252
(58) Field of Search ................................ 501/141, 155; 588/9, 10, 901, 252; 264/679, 680

(56) References Cited

U.S. PATENT DOCUMENTS 4,112,033 A * 9/1978 Lingl .......................... 501/155
5,175,134 A * 12/1992 Kaneko et al. ............. 501/155

FOREIGN PATENT DOCUMENTS

SU 1661162 A * 7/1991

* cited by examiner

*Primary Examiner*—Michael Marcheschi
(74) *Attorney, Agent, or Firm*—Robert L. Epstein; Harold James; James & Franklin, LLP

(57) ABSTRACT

Building bricks and tiles are made by mixing 60% to 75% clay, 20% to 40% sludge and 1% to 10% sand, all percentages being by weight of the total composition. This process utilizes industrial waste products to provide building materials which are lighter and stronger than conventional materials.

10 Claims, No Drawings

COMPOSITION AND PROCESS FOR MAKING BUILDING BRICKS AND TILES

The present invention utilizes industrial waste and relates to a synergistic composition for producing building bricks and tiles therefrom. It more particularly relates to a process for preparing said composition for providing lighter and stronger bricks and tiles than conventional burnt clay building bricks.

There is a need for new kind of bricks to replace the conventional ones. The conventional burnt clay building bricks are heavier on the foundation and not as strong as the bricks produced by the present invention. The bricks made from the composition of the invention are lighter and have increased compression strength due to the presence of industrial waste.

The disposal of waste is a global problem. Presently, all over the world the industrial waste is disposed off by dumping it down old mine shafts or into other remote landfill sites. But these alternatives do not provide a permanent solution to the problem of disposal of waste. As a result of growing increase in the production of waste due to increase in the number of industries, the scientific community and environmentalists have been concerned about the ecological imbalance degradation caused by such wastes and pollutants.

The present invention addresses itself to the problem and provides a composition which utilizes industrial waste amongst other ingredients for producing bricks and tiles which are lighter and stronger than the conventional bricks.

The industrial waste is derived from the waste generated from electroplating. The disposal of such wastes varies from industry to industry. The industrial wastes from different industries are of different nature. For instance, the waste generated by a power plant is different from that generated by a nuclear plant. The industrial waste employed in the present invention comprises sludge. This sludge may contain hexavalent chromium beyond determination level (BDL), total chromium as chromium in the range of from 145 mg/kg to 1532 mg/kg, copper in the range of from 76.78 to 414 mg/kg and nickel in the range of from 15.72 to 24.62 mg/kg.

Bricks made of fly ash generated by power plants are well known. These bricks can be made of 50% to 80% by weight of fly ash 1% to 5% by weight of alkaline additives and lime. A mix prepared with the foregoing ingredients is subjected to grinding and blending with water. The next step is of moulding the blended mix to obtain a shaped product such as a brick which is cured and aged by conventional methods.

While the prior art composition and process do teach the preparation of a brick composition there is no teaching in respect of a synergistic composition as claimed herein. In the present synergistic composition and process of making it, the ingredients of the composition are clay in an amount of from 60% to 75% by weight of the total composition, sludge in an amount of from 20% to 40% by weight and sand in an amount of 1% to 10% by weight. The especially preferred composition which shows the best results is the one which comprises 65% to 70% of clay, 25% to 30% of sludge and 1% to 5% of sand. Thus the present invention is distinguishable on the basis of the constituents of the composition.

Accordingly, the present invention provides a synergistic composition for making building bricks and tiles comprising a mixture of 60% to 75% by weight of clay, sludge of the kind such as herein described in an amount of from 20% to 40% and 1% to 10% by weight of sand, all percentages being by weight of the total composition.

It will be clear from the foregoing description as well as the description contained hereinafter that a novel brick and tile making composition of the present invention is neither a simple admixture nor a product of a chemical reaction but a synergistic composition having improved and unexpected properties.

A conventional brick and tile composition comprises clay in an amount of 95% of total composition and 5% of sand. These bricks are conventionally of 9"×4.50"×3" in size and weight between 3 to 3.5 kgs. These are prepared by mixing clay and sand followed by shaping and firing in kilns. The weight of the conventional bricks is greater than the brick made from the composition of the present invention by almost a kilogram. The compressive strength of conventional brick is between 5.5. to 55 $Kg/cm^2$ and that of the brick produced by the composition of the present invention is above 100 $kg/cm^2$. Similarly, water absorption test conducted on a conventional brick as well as the brick made from the invented composition have revealed that the water absorption of the conventional brick was about 10% to 25% and that of the brick prepared by the composition of the present invention was only in the range of from 17% to 21%. These and other properties are indeed surprising and unexpected and are different from the properties of the individual ingredients forming the brick composition.

Among other objectives of the present invention is to provide a process for preparing the synergistic composition for making bricks and tiles for construction purposes. It has surprisingly been found that by mixing clay in an mount of from 60% to 75% by weight of the total composition, sludge in an amount of from 20% to 40% by weight of the total composition and sand in an amount of from 1% to 10% by weight, a synergistic composition of inter alia improved compressive strength is produced which can be employed for making bricks and tiles.

Another objective of the present invention is to reduce the land degradation by utilizing the industrial waste from a chemical treatment plant such as an electroplating plant. This is again achieved by employing only 75% of the clay as opposed to 95% in the conventional brick making industry.

The present invention employs the technique of preparing a synergistic composition by mixing clay, industrial waste and sand in a fixed proportion so as to strike a synergistic balance.

By utilizing the industrial waste which comprises at least 20% to 40% of said composition, the requirement of clay from the land has been reduced by at least the same amount. This industrial waste can be in the form of sludge or solid waste obtained from waste water treatment facilities of electro-plating industries. On mixing at least 20% to 40% of industrial waste, 60% to 75% of clay and 1% to 10% of sand by weight of the total composition, the synergistic composition so produced exhibits higher compressive strength and lesser water absorption as seen on comparison of the conventional bricks with the bricks produced by the composition of the present invention. In addition, the brick produced is lighter in weight than the conventional one.

On testing the bricks made from the composition of the present invention it has been found that a compressive strength of above 100 $kg/cm^2$ to 200 kg/cm2 can be seen. As a result, any construction employing the bricks made from the composition of the present invention will have a higher load bearing capacity than the conventional bricks and therefore the need to provide a deep foundation even for a tall or a medium size structure can be obviated.

Any conventional clay may be used in the preparation of the composition of this invention. However, clays employed can be selected from bentonite, attapulgite and kaolin etc. and their mixture. The particle size of clay can vary from 100 to 200 mesh. It has now been surprisingly found that if clay is replaced by 20% to 40% by weight of industrial waste or sludge not only the degree of compressive strength of brick so produced is improved but also its weight is considerably reduced by at least a kilogram. The conventional brick has a compressive strength of 5.5. $kg/cm^2$ to 55 $kg/cm^2$ and the brick prepared from the composition of the present invention has a compressive strength of above 100 $kg/cm^2$. The weight of a conventional brick is 3 to 3.5 kgs. whereas the brick prepared by the composition of the present invention has a weight which is about 2 to 2.5 kgs.

The bricks prepared by the novel composition of the present invention were immersed in distilled water for 72 hours. Thereafter, the water quality was analysed and the test results showed that the major hazardous material were below detectable limits. This proved that even when bricks are exposed for 72 hours of continuous wetting the leachate are non-toxic. Hence, these bricks are eco-friendly.

TABLE I

Test results for sample bricks soaked in distilled water for 72 hours.

| Sl.No. | Parameters | Sample A | Sample B | Sample C |
|---|---|---|---|---|
| 1. | pH (at room temperature) | 8.39 | 7.80 | 8.14 |
| 2. | Conductivity (umhos at 25° C.) | 100 | 40 | 70 |
| 3. | TDS (mg/l) | 64 | 25.6 | 44.8 |
| 4. | Chlorides as Cl (mg/l) | BDL* | BDL | BDL |
| 5. | Phosphate as $PO_4$ (mg/l) | BDL | BDL | BDL |
| 6. | Copper as Cu (mg/l) | BDL | BDL | BDL |
| 7. | Zinc as Zn (mg/l) | 0.3 | 0.3 | 0.3 |
| 8. | Sulphate as $SO_4$ (mg/l) | 5.0 | 5.0 | 5.0 |
| 9. | Total Chromium as Cr (mg/l) | BDL | BDL | BDL |
| 10. | Hexavalent Chromium as $CR^{6+}$ (mg/l) | BDL | BDL | BDL |
| 11. | Aluminium as Al (mg/l) | BDL | BDL | BDL |
| 12. | Tin as Sn | BDL | BDL | BDL |
| 13. | Nickel as Ni | BDL | BDL | BDL |

The expressions TDS and BDL hereinabove and hereinafter referred to represent "total dissolved solids" and "below detectable limit".

Samples A,B & C comprised clay in an amount of from 60% to 75%, the sludge and sand being in an amount of from 20% to 40% and 5% to 10% respectively. On comparision of the thermal conductivity, strength and density of the bricks prepared from the composition of the present invention with the normal conventional burnt bricks, it was found that such conductivity was lower in the case of improved bricks. This low thermal conductivity helps in achieving higher thermal comfort within a building constructed with these bricks. These bricks have relatively lower denity and an average compressive strength of 11 Mpa which satisfies the structural requirements of ISO 1905–1987 of low rise construction as load bearing bricks.

TABLE II shows the thermal conductivity, strength and density of sample bricks.

| Sl.No. | Sample | Density | Mean Strength (Mpa) | Compressive | Thermal Conductivity (w/mk) |
|---|---|---|---|---|---|
| 1. | Sample brick Produced from the Composition of the Present invention. | 1616 | 11 Mpa | | 0.50 |
| 2. | Normal burnt clay Brick | 1900 | Minimum required | For load Bearing Construction 3.5 Mpa for Single storey | 1.91 |

From the foregoing description, it is abundantly clear that the brick composition of the invention results in a substantially lighter and unexpectedly stronger building bricks. Many electroplating industries find it difficult to dispose off their sludge (waste), use of at least 20% to 40% of their sludge with clay and sand would help in considerable reduction of the waste from such units. The following table illustrates the synergistic nature of the composition in comparison with the conventional brick:

TABLE III

| TESTS | CONVENTIONAL BRICK | IMPROVED BRICK |
|---|---|---|
| Compression strength | 5.5 to 55 $kg/cm^2$ | Above 100 $kg/cm^2$ |
| Water absorption test | 10 to 25% | 17 to 21% |
| Efflorescence test | High | Slight in degree |
| Thermal conductivity test | 1.91 w/mk | 0.50 w/mk |

Also set out below are the comparative results of separate tests conducted on the bricks prepared by the composition of the invention and the conventional brick.

TABLE IV

COMPRESSION TEST ON BRICKS PREPARED BY THE COMPOSITION OF THE PRESENT INVENTION.

| SL. NO. | SAMPLES | DIMENSIONS (mm) | AREA ($mm^2$) | CRUSHING LOAD (kg) | CRUSING STENGTH ($Kg/cm^2$) |
|---|---|---|---|---|---|
| 1. | Sample I | 303 × 150 × 100 | 45450 | 60000 | 132 |
| 2. | Sample II | 320 × 147 × 100 | 47040 | 58500 | 124 |
| 3. | Sample III | 302 × 149 × 101 | 44998 | 50500 | 112 |
| 4. | Sample IV | 255 × 153 × 95 | 39015 | 43000 | 110 |
| 5. | Sample V | 210 × 97 × 49 | 20370 | 35500 | 174 |
| 6. | Sample VI | 208 × 97 × 52 | 20176 | 38000 | 188 |
| 7. | Sample VII | 210 × 98 × 49 | 20580 | 42000 | 204 |
| 8. | Sample VIII | 208 × 100 × 50 | 20800 | 31500 | 151 |

Samples I to VIII comprise clay in an amount of from 60% to 75%, the sludge and sand in an amount of from 20% to 40% and 1% to 10% respectively.

| COMPRESSION TEST ON CONVENTION SBI BRICKS; | | | | |
|---|---|---|---|---|
| SL. NO. | REF. | DIMENSIONS (cm) | AREA (cm$^2$) | CRUSING LOAD (kg) | CRUSING STRENGTH (Kg/cm$^2$) |

| SL. NO. | REF. | DIMENSIONS (cm) | AREA (cm$^2$) | CRUSING LOAD (kg) | CRUSING STRENGTH (Kg/cm$^2$) |
|---|---|---|---|---|---|
| 1. | SBI | 21.6 × 10.0 × 7.5 | 216.0 | 11500 | 53.241 |
| 2. | SBI | 22.0 × 10.1 × 7.2 | 222.2 | 10000 | 45.005 |
| 3. | SBI | 22.1 × 10.2 × 7.5 | 225.42 | 9500 | 42.144 |
| 4. | SBI | 21.4 × 10.0 × 7.0 | 224.00 | 12000 | 53.571 |
| 5. | SBI | 22.5 × 10.3 × 7.5 | 231.75 | 12500 | 53.937 |
| 6. | SBI | 21.8 × 10.0 × 7.5 | 218.0 | 11500 | 52.752 |
| 7. | SBI | 22.1 × 10.0 × 7.0 | 221.0 | 11000 | 49.774 |
| 8. | SBI | 22.3 × 10.2 × 7.2 | 227.46 | 10500 | 46.162 |
| 9. | SBI | 22.5 × 10.2 × 7.5 | 229.50 | 14000 | 61.002 |
| 10. | SBI | 22.3 × 10.0 × 7.2 | 223.00 | 15000 | 67.265 |
| 11. | SBI | 22.2 × 10.0 × 7.1 | 222.00 | 10500 | 47.297 |
| 12. | SBI | 22.0 × 10.2 × 7.2 | 224.40 | 12000 | 53.476 |
| 13. | SBI | 22.0 × 10.0 × 7.5 | 222.0 | 12000 | 54.050 |
| 14. | SBI | 22.5 × 10.2 × 7.0 | 229.5 | 10500 | 45.752 |
| 15. | SBI | 22.2 × 10.0 × 7.5 | 222.0 | 12500 | 56.306 |

Average compressive strength = 52.116 kg/cm$^2$

COMPRESSION TEST ON CONVENTIONAL V.S.B BRICKS:

| SL. NO. | REF. | DIMENSIONS (mm) | AREA (mm$^2$) | CRUSHING LOAD (kg) | CRUSHING STRENGTH (N/mm$^2$) |
|---|---|---|---|---|---|
| 1. | VSB | 210 × 100 × 67 | 21000 | 112815 | 5.37 |
| 2. | VSB | 220 × 101 × 71 | 22220 | 132435 | 5.96 |
| 3. | VSB | 220 × 100 × 70 | 22200 | 117720 | 5.35 |
| 4. | VSB | 218 × 96 × 71 | 20928 | 137340 | 6.56 |
| 5. | VSB | 222 × 101 × 68 | 22422 | 186390 | 8.31 |

Average compressive strength = 6.31 N/mm$^2$

TABLE V

WATER ABSORPTION TEST ON BRICKS PREPARED BY THE COMPOSITION OF THE PRESENT INVENTION.

| S. NO. | SAMPLES | % OF WATER ABSORPTION | AVERAGE VALUE OF WATER ABSORPTION |
|---|---|---|---|
| 1. | Sample I | 17.9 | |
| 2. | Sample II | 17 | |
| 3. | Sample III | 17.85 | |
| 4. | Sample IV | 19.92 | |
| 5. | Sample V | 20 | 19.09% |
| 6. | Sample VI | 20.5 | |
| 7. | Sample VII | 20.12 | |
| 8. | Sample VIII | 19.43 | |

WATER ABSORPTION TEST ON CONVENTIONAL SBI BRICKS

| S. NO. | BRAND | % OF WATER ABSORPTION |
|---|---|---|
| 1. | SBI | 12.35 |
| 2. | SBI | 12.73 |
| 3. | SBI | 12.51 |
| 4. | SBI | 13.00 |
| 5. | SBI | 13.61 |
| 6. | SBI | 11.23 |
| 7. | SBI | 12.48 |
| 8. | SBI | 12.15 |
| 9. | SBI | 12.18 |
| 10. | SBI | 12.60 |
| 11. | SBI | 11.71 |
| 12. | SBI | 13.22 |
| 13. | SBI | 12.86 |
| 14. | SBI | 12.83 |
| 15. | SBI | 13.00 |

Average % of Water absorption = 12.564%

TABLE V-continued

WATER ABSORPTION TEST ON CONVENTIONAL VSB BRICKS

| S. NO. | REF. | % OF WATER ABSORPTION |
|---|---|---|
| 1. | V.S.B. | 10.44 |
| 2. | V.S.B. | 8.53 |
| 3. | V.S.B. | 9.27 |
| 4. | V.S.B. | 10.73 |
| 5. | V.S.B. | 11.30 |

Average % Water absorption = 10.05%

TABLE VI

EFFLORESCENCE TEST ON BRICKS PREPARED BY THE COMPOSITION OF THE PRESENT INVENTION:

| SL.NO. | SAMPLES | DEGREE OF EFFLORESCENCE |
|---|---|---|
| 1. | Sample I | Nil |
| 2. | Sample II | Slight |
| 3. | Sample III | Slight |
| 4. | Sample IV | Slight |
| 5. | Sample V | Slight |

EFFLORESCENCE TEST ON CONVENTIONAL V S B BRICKS

| SL.NO. | REF. | REMARKS |
|---|---|---|
| 1. | V S B | Slight |
| 2. | V S B | Nil |
| 3. | V S B | Nil |
| 4. | V S B | Nil |
| 5. | V S B | Nil |

In a typical process for producing the synergistic composition fine clay, sludge and sand can be thoroughly mixed in chemical mixers. The mix can then be formed into the desired shape, such as a brick or a tile. The extruded brick can be dried in the air at room temperature for about 72 hours. It can then be fired in a kiln or furnace at 700° C. for six hours and cooled gradually in air to form the finished product.

The following non-limiting examples will serve to illustrate the invention in greater details.

EXAMPLE 1

A 20% of sludge from a filter press containing hexavalent chromium beyond determination level, metal chromium in an amount of 523 mg/kg of total sludge, copper and nickel being 332.8 mg/kg and 15.72 mg/kg respectively was thoroughly mixed with 75% clay and balance being sand. The bricks produced from the composition were subjected to compression test. On being subjected to a compression load of 60,000 kilograms, the bricks showed the crushing strength of 132 kg/cm$^2$. On the other hand, the compression strength of a conventional brick was found to be 5.5 to 55 kg/cm$^2$.

EXAMPLE 2

A sludge sample in an amount of 20% of the total composition having hexavalent chromium beyond determination level, metal chromium 145 mg/kg of the total sludge, copper and nickel being 76.78 and 24.62 mg/kg respectively were mixed with 73% clay. Sand was taken in an amount of 7% of the total composition. A brick produced from the synergistic mixture showed enhanced and unexpected crushing strength of 124 Kg/cm$^2$ when subjected to the same load to which the conventional brick was subjected. In another test conducted on a brick made from the composition of the present invention for water absorption, it was found that 17% of absorption took place.

EXAMPLE 3

The composition of example 1 was employed except that instead of 75% of clay 70% of it was employed. The amount of sludge was correspondingly increased to 25% and balance being sand. The composition so produced crushed under the crushing load of 58500 kgs and showed crushing strength of 124 kg/cm$^2$.

EXAMPLE 4

A brick composition containing 35% sludge by weight 60% clay and 5% sand was mixed together. A brick produced from such composition was subjected to testing. On testing, it was found that the thermal conductivity was 0.50 w/mk. On the other hand, higher thermal conductivity of 1.91 w/mk was observed in respect of conventional burnt clay brick. The density of the brick prepared from the composition is 1616. This was found to be 284 gms/c.c less than the conventional brick which was of a density equal to 1900 gms/cc. The mean compressive strength (Mpa) was found to be 110.22 Kg/cm$^2$ and 35.07 Kg/cm$^2$ in respect of conventional brick.

EXAMPLE 5

The composition containing 55% by weight of clay, 35% of sludge by weight and 10% of sand was mixed together. One of the bricks produced from the composition were subjected to compression test. It was found that the brick crumbled under the crushing load of 43000 kilogram and the existing strength if 110 kg/cm$^2$ was recorded.

The foregoing examples demonstrate the synergistic nature of the composition.

I claim:

1. A synergistic composition for making building bricks and tiles comprising a mixture of (a) clay present in an amount of from 60% to 75%, (b) sludge comprising chromium in an amount of from 145 mg/kg to 1532 mg/kg, the sludge being present an amount of from 20% to 40% and (c) sand present in the amount of from 1% to 10%, wherein the percentages are by weight of the total composition.

2. The composition of claim 1 wherein the sludge further comprises nickel in an amount of from 15.72 to 24.62 mg/kg and copper in an amount of 76.78 to 414 mg/kg.

3. The composition of claim 1 wherein the clay is selected from attapulgite, kaolin, bentonite or mixtures thereof.

4. The composition of claim 1 wherein the sludge comprises 25% to 35% of the total composition.

5. The composition of claim 1 wherein the clay is present in an amount of from 65% to 70%, the sludge is present in an amount of from 25% to 30% and the sand is present in an amount of from 1% to 5%.

6. A process for preparing a synergistic composition for making building bricks and tiles comprising the steps of: mixing clay, sludge comprising chromium in an amount of from 145 mg/kg to 1532 mg/kg, and sand, the clay being present in an amount of from 60% to 75%, the sludge being present in an amount of from 20% to 40% and the sand being present in an amount of from 1% to 10%, the percentages being by weight of the total composition; forming the mixture into a shape; drying the mixture, and firing the mixture.

7. The process of claim 6 wherein the sludge further comprises copper in an amount of from 76.78 mg/kg to 414 mg/kg and nickel in an amount of from 15.72 to 24.62 mg/kg.

8. The process of claim 6 wherein the clay is selected from attapulgite, kaolin, bentonite or mixtures thereof.

9. The process of claim 6 wherein the sludge comprises of from 25% to 35% of the total composition.

10. The process of claim 6 wherein the clay is present in an amount of from 65% to 70%, the sludge is present in an amount of from 25% to 30% and the sand is present in an amount of from 1% to 5%.

\* \* \* \* \*

UNITED STATES PATENT AND TRADEMARK OFFICE
CERTIFICATE OF CORRECTION

PATENT NO. : 6,440,884 B1
DATED : August 27, 2002
INVENTOR(S) : Theophilus Devagnanam It is certified that error appears in the above-identified patent and that said Letters Patent is hereby corrected as shown below:

<u>Title page,</u>
Item [75], Inventors, first name should read -- Theophilus --

Signed and Sealed this

Ninth Day of September, 2003

JAMES E. ROGAN
*Director of the United States Patent and Trademark Office*